July 7, 1959  T. L. CARPENTER  2,893,774
AUTOMOBILE DOOR LOCK MECHANISM
Original Filed July 13, 1955  3 Sheets-Sheet 3
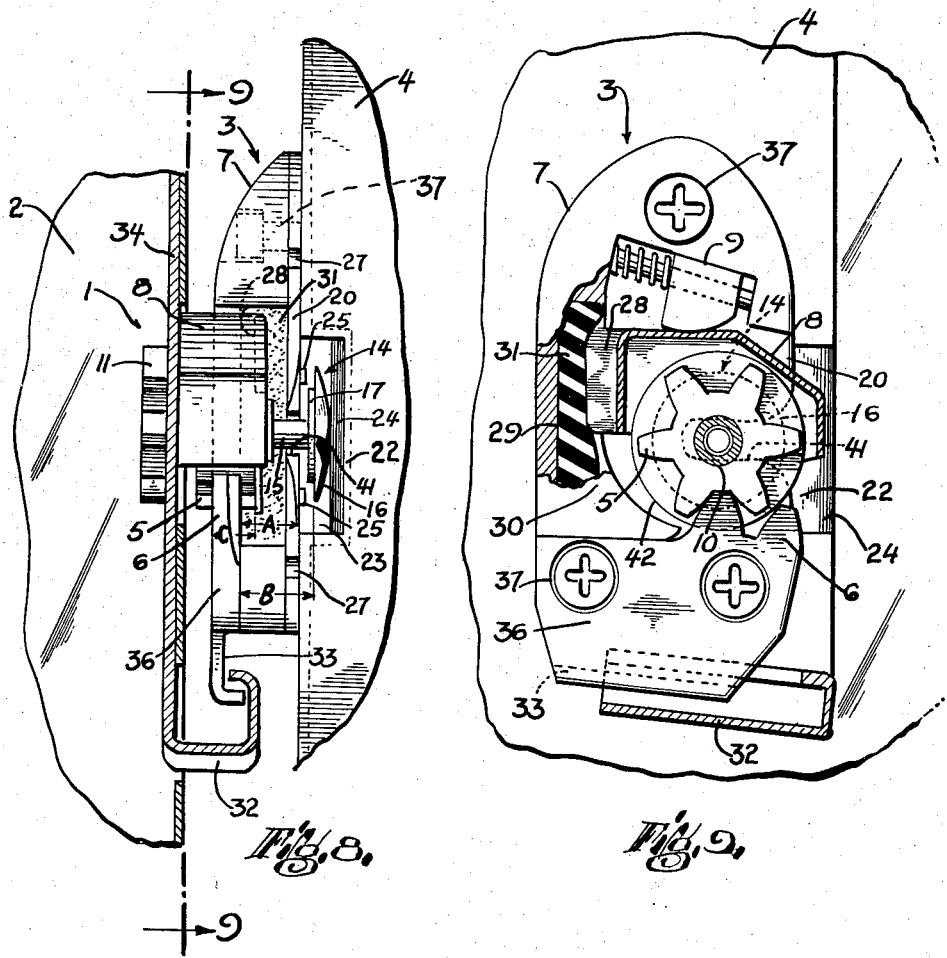
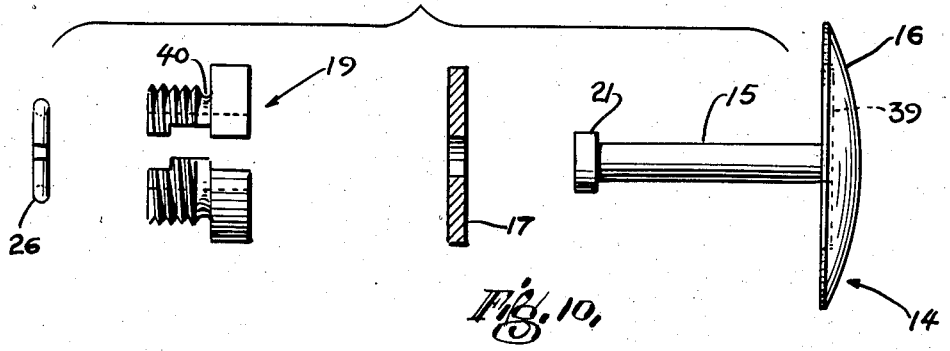
INVENTOR
Tracy L. Carpenter
BY
Pennie, Edmonds, Morton, Barrows & Taylor
ATTORNEY

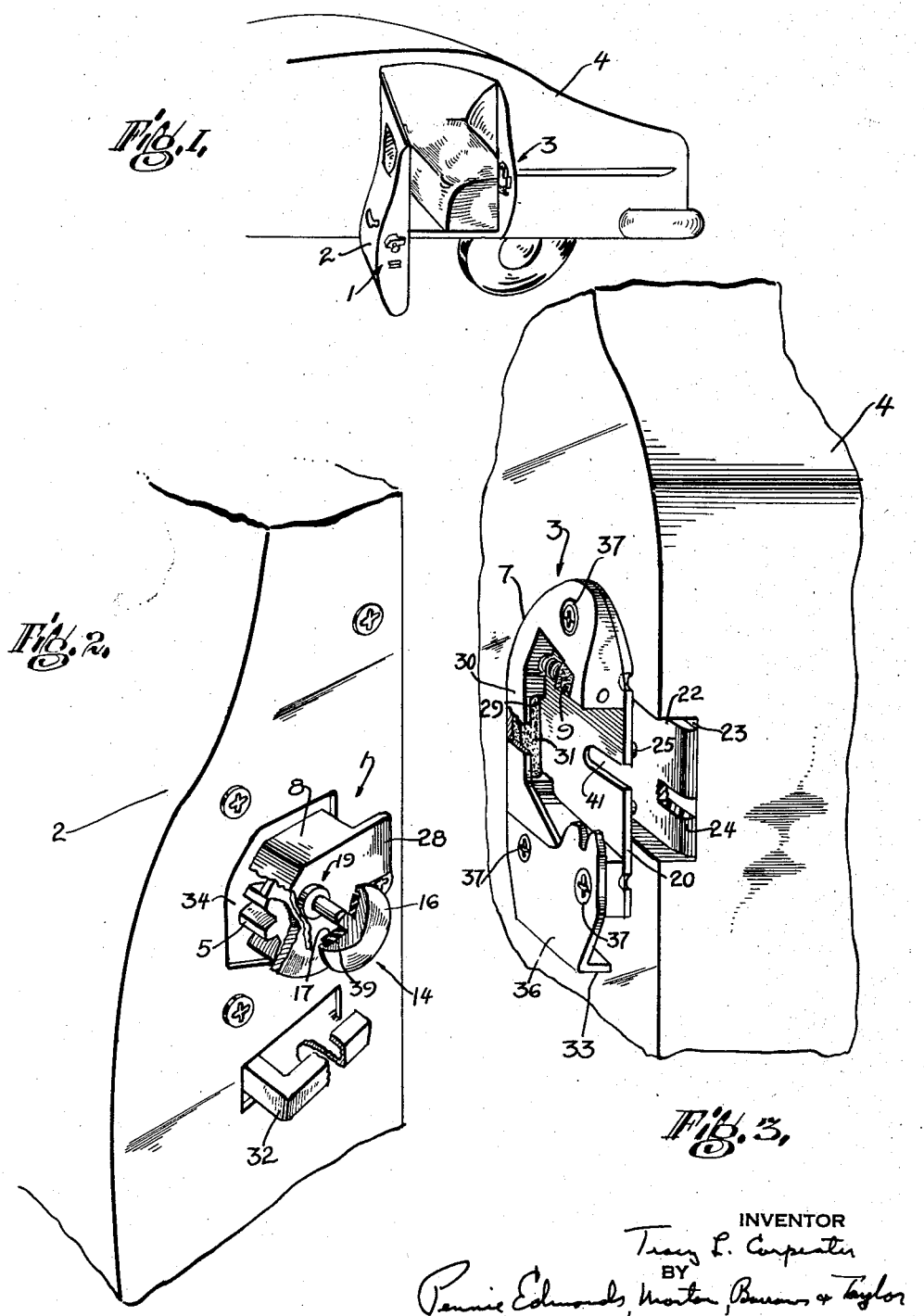

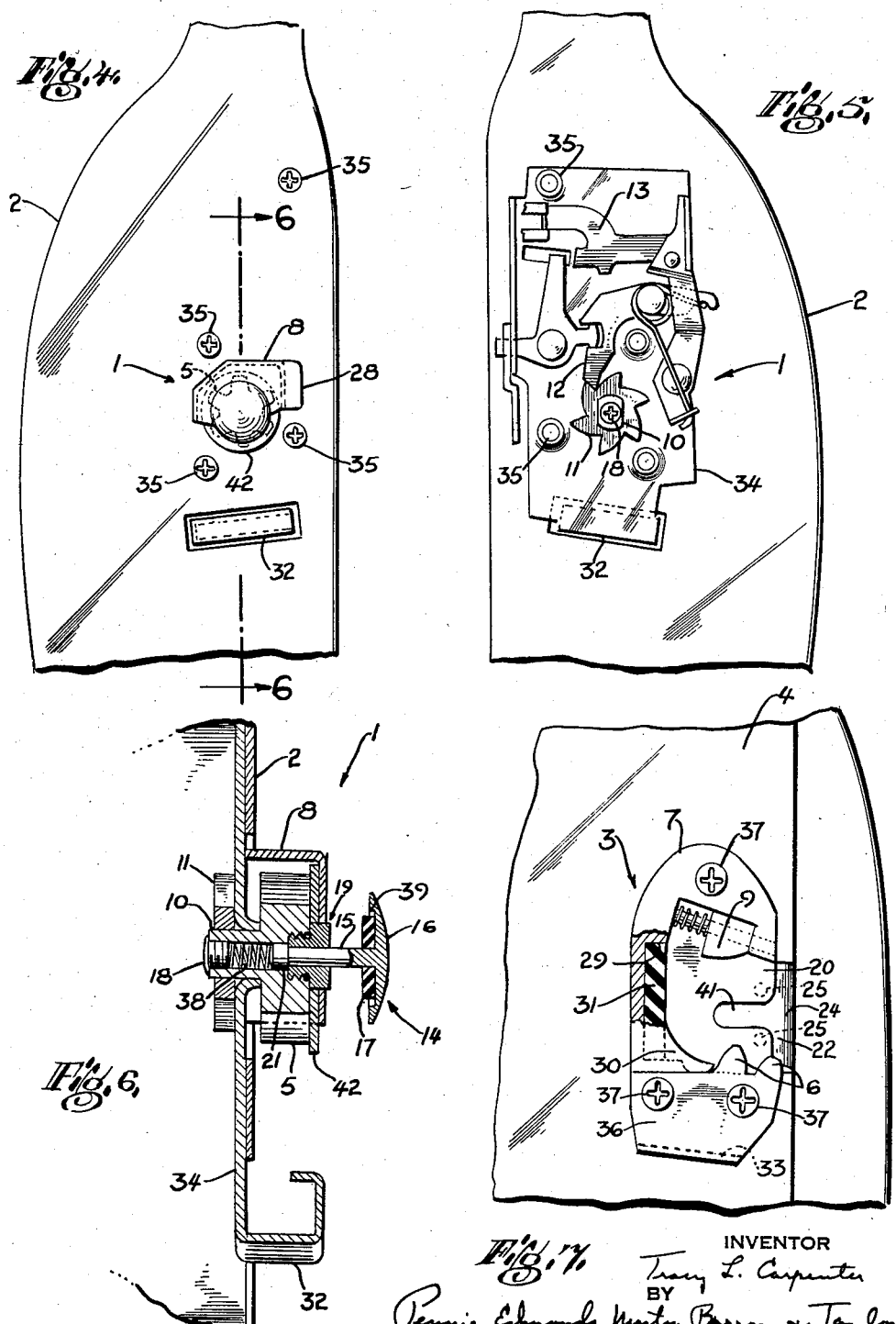

United States Patent Office 2,893,774
Patented July 7, 1959

2,893,774

AUTOMOBILE DOOR LOCK MECHANISM

Tracy L. Carpenter, Oceanside, N.Y., assignor to Tracy Accessories, Inc., Oceanside, N.Y., a corporation of New York Original application July 13, 1955, Serial No. 521,694. Divided and this application July 30, 1956, Serial No. 600,964

12 Claims. (Cl. 292—280)

This invention relates to a mechanism comprising co-acting members adapted to lock an automobile door into place by impressing lateral restraint thereon with respect to its associated automobile body and more particularly to improvements associated with said lock mechanism which prevent relative longitudinal or vertical displacement of the component coacting members under conditions of unusual stress.

This application is a division of my copending application Serial No. 521,694, filed July 13, 1955.

The conventional automobile door lock mechanism comprises two coacting members, a lock member which includes a roller gear having external teeth thereon, and a striker member which includes restrained gear teeth adapted to mesh with the said roller gear teeth. The lock member is usually attached to an automobile door while the striker member is usually attached to the body of an automobile. The roller gear teeth and restrained teeth of said coacting members are conventionally positioned on opposing door and body edges so that they mesh laterally with respect to the automobile body. This arrangement impresses lateral restraint only on the door, such restraint being all that is necessary under usual conditions. However, under conditions of stress and shock resulting from collision impact, the automobile chassis is liable to spring, or the door or body deform, thereby exerting longitudinal and sometimes vertical separating forces on the coacting lock and striker members. Due to the fact that there are no provisions for longitudinal or vertical restraint associated with the conventional lock mechanism, collision impact may cause the meshed gear teeth associated therewith to slide out of engagement with one another, thereby permitting the door to fly open. An alarming number of automobile casualties can be traced to the opening of automobile doors as the result of collision thereby permitting occupants of the automobile to be hurled therefrom.

It is an object of this invention to provide improvements associated with a conventional automobile door lock mechanism which prevent disengagement of said lock mechanism under conditions of unusual stress by preventing longitudinal and vertical displacement of the coacting members comprising said lock mechanism.

To this end, the conventional lock mechanism comprising first and second coacting members, one attached to the door and the other to the body of an automobile, has associated therewith the improvement which comprises a restraining member or plunger associated with said first member, the restraining member or plunger comprising a shaft and overhanging head, the shaft being supported adjacent the first member and extending longitudinally therefrom, head first toward the said second member, and a bracket associated with said second member so that the head of the restraining member or plunger passes behind the bracket and will contact said bracket before there is longitudinal disengagement of said first and second members, the bracket having a slot therein positioned in the path of the shaft of the restraining member or plunger and having a receiving open end to permit entry of the shaft, the width of said slot being larger than that of the shaft but smaller than that of the head. Usually the first member includes a laterally arranged rotatably mounted roller gear having external teeth thereon, and a locking mechanism to controllably prevent rotation of said roller gear, and the second member has laterally arranged restrained gear teeth adapted and positioned to mesh with said roller gear teeth, thereby exerting lateral restraint on the automobile door with respect to the automobile body.

In the conventional locking mechanism the striker member usually includes a so-called "striker plate" having the restrained teeth machined thereon, said plate being attached directly to its associated automobile member. With such an arrangement, the described slotted bracket is advantageously made independent of the striker plate and is inserted between the striker plate and its associated automobile member, the automobile member having a recess therein arranged longitudinally behind the bracket slot for the accomodation of the described plunger head. In the event that the plunger head extends beyond the recess in the automobile member, the plunger is spring mounted to permit longitudinal recession into an axial bore in the roller gear and the outer surface of the plunger head is tapered so that a recessing force is applied thereto upon contact with the backwall of the accommodating recess. Advantageously the backwall has a tapered portion to facilitate the recession of the plunger.

To permit adjustment of the striker plate by a method which will be described in greater detail hereinafter, the bracket may be indented with respect to the striker plate so that a portion of the striker plate overhangs the bracket.

The back surface of the slotted bracket may have two protuberances thereon postioned one to either side of the slot, the vertical spacing between said protuberances being less than the width of the plunger head, and the height of said protuberances being less than the clearance of the inner surface of the plunger head over the back surface of the bracket. Such arrangement prevents lateral movement of the plunger out of the slot when the plunger head is pressed against the back surface of the bracket. Advantageously the inside of the plunger head is recessed and a compressible bushing inserted therein, the width of the bushing being less than the spacing between the bracket protuberances and the height of the uncompressed bushing being sufficient to insure clearance of the inner surface of the plunger head over the protuberances, the compressible bushing being sufficiently small in size with respect to the recess in the plunger head to fit within the recess when in compressed condition, thereby permitting the inner surface of the plunger head to contact the back surface of the slotted bracket.

The invention also contemplates the use of additional devices adapted to prevent longitudinal and vertical displacement of the coating members comprising the conventional automobile door locking mechanism. One of these devices comprises a restraining member attached to one of the coacting members of the locking mechanism and positioned longitudinally in front of the gear teeth associated with said coacting member so as to overlap the gear teeth of the other coacting member when the two coacting members are in meshed relationship, the restraining member being positioned sufficiently close to its associated coacting member to prevent longitudinal disengagement of the meshed teeth of the two coacting members. Advantageously the restraining member is attached to the lock member, the restraining member comprising a washer positioned longitudinally in front of the roller gear associated with the lock member in axial coincidence therewith and extending sufficiently beyond the dedendum circle of said roller gear to overlap the restrained gear teeth of the striker member when the two coacting members are meshed. This construction is covered in my aforementioned copending application Ser. No. 521,694.

Another of the aforementioned devices comprises a lateral extension member attached to the lock member and extending laterally in front of the roller gear associated with the lock member, the striker member having a recess therein and a compressible bumper within said recess, the recess and bumper being positioned in alignment with the lateral extension member and sufficiently laterally behind the restrained gear teeth of the striker member so that the extension member indents the bumper when the coacting members are in meshed relationship. This device acts in a dual capacity, firstly as a longitudinal and vertical restraint, and, secondly, as a bumper arrangement preventing rattle and backlash. In the conventional locking mechanism, the lock member may have a housing enclosing the said roller gear and the striker member incorporates the aforementioned striker plate. With this arrangement, the extension member preferably forms part of the housing, the striker plate being recessed to provide the described extension member accommodation.

The invention will now be described in detail in connection with the accompanying drawings, in which:

Fig. 1 is a perspective view of an automobile showing generally the relationship between the lock member and striker member comprising the lock mechanism of this invention;

Fig. 2 is a perspective view of the lock member of this invention shown attached to an automobile door, portions of the lock member being cut away to better illustrate the component parts;

Fig. 3 is a perspective view of the striker member of this invention shown attached to an automobile body, portions of the striker member being cut away to better illustrate the component parts;

Fig. 4 is a front view of the lock member of this invention shown attached to an automobile door;

Fig. 5 is a back view of the lock member and automobile door illustrated in Fig. 4, showing the locking means associated therewith;

Fig. 6 is a sectional view of the lock member of this invention taken along line 6—6 of Fig. 4 to illustrate the construction thereof;

Fig. 7 is a front view of the striker member of this invention shown attached to an automobile body, part of said member being cut away to better illustrate the invention;

Fig. 8 is a side view of the lock member and striker member of this invention shown in meshed relationship, part of said lock member being cut away to better illustrate the invention;

Fig. 9 is a sectional view of the lock member and striker member of this invention taken along line 9—9 of Fig. 8, part of the striker member being cut away to better illustrate the invention;

Fig. 10 is a blown up view of the plunger and associated parts which fit into the lock member of this invention.

Fig. 1 illustrates an automobile having attached thereto the lock mechanism of this invention. The lock mechanism comprises two coacting members, a lock member 1 attached to an exposed edge of door 2 of the automobile, and a striker member 3 attached to an opposing exposed edge of body 4 of the automobile. In the following description of the invention and in the appended claims relative positions of portions of each coacting member will be indicated as follows: (1) In the longitudinal sense, assuming longitudinal separation of the coacting members, that portion of a first coacting member which is closer to a second coacting member than a reference portion of said first member will be considered to be in front of said reference portion; (2) in the lateral sense, assuming the door to be in an open position with respect to the body so that there is lateral separation of the coacting members, that portion of a first coacting member which is closer to a second coacting member than a reference portion of said first member, will be considered to be in front of said reference portion. In addition references to lateral and longitudinal positions will be considered to be made with respect to the automobile body with the door closed.

The conventional door lock mechanism comprises two coacting members, a lock member and a striker member. The lock member is usually attached to the door of an automobile and has associated therewith the mechanism by which the door is locked into position or released therefrom. The striker member is usually attached to the automobile body into which the door is fitted.

Referring to Figs. 2, 4 and 5, only those portions of the illustrated assembly that comprise the conventional lock mechanism will initially be described. The conventional lock mechanism comprises a roller gear 5, rotatably mounted and enclosed in a housing 8. The gear and housing are attached to plate 34 (Fig. 5) bolted onto the associated automobile member, in this case door 2, by means of bolts 35.

As illustrated in Fig. 5 the lock member has associated therewith means for controllably preventing rotation of roller gear 5. The roller gear has a shank 10 extending through plate 34 to which is attached a star gear 11. Cam 12, when in the position shown, permits rotation of the roller gear in one direction, in this case clockwise as seen in Fig. 4, but restrains rotation in the opposite direction. When the cam is raised by lever linkage 13, the roller gear is permitted to freely rotate.

The striker member 3 illustrated in Fig. 3 comprises a strike plate 7 having a mating member 36 attached thereto by means of bolts 37. Mating member 36 has gear teeth 6 machined thereon, said teeth thereby being restrained from movement. An antirattle device 9 is spring mounted within the striker plate.

The described lock mechanism prevents outward lateral movement only of the automobile door with respect to the automobile body. Under usual conditions, such restraint is adequate since longitudinal and vertical movement of the door with respect to the automobile body is restricted by the frame and chassis construction of the automobile. However, under conditions of unusual stress or shock resulting from collision impact, the chassis may spring out of shape, or the door or body deform, thereby exerting longitudinal or vertical separating forces on either or both of the coacting members of the locking mechanism. In that event the described conventional lock mechanism will not prevent the disengagement of the coacting members due to longitudinal or vertical separation of the meshed teeth.

The invention to be described comprises four cooperating safety features designed to restrain longitudinal and vertical separation of the coacting members of a door lock mechanism under conditions of unusual stress. The first of these features is illustrated generally in Figs. 2, 3 and 9 and more specifically in Figs. 6, 7 and 10. This feature comprises two mating parts, a plunger 14 associated with the lock member 1 and a bracket 20 associated with the striker member 3.

Referring to Figs. 2 and 6, the plunger 14, comprising shaft 15 and overhanging head 16, extends longitudinally from roller gear 5 in axial coincidence therewith toward striker member 3. A compressible bushing 17, preferably hard rubber, is fitted into recess 39 in head 16. Shank 10 of roller gear 5 has an axial bore therein into which shoulder 21 of shaft 15 is fitted. Screw 18 and lock nut 19 are threaded into roller gear 5 at either extreme of its axial bore, shaft 15 being fitted through an axial bore in lock nut 19. This arrangement permits longitudinal movement of plunger 14 between the limits defined by screw 18 and lock nut 19. Spring 38 inserted between screw 18 and shoulder 19 maintains the shoulder against lock nut 18 unless a recessing force is applied to plunger head 16.

The plunger and roller gear mounting are designed to withstand large longitudinal forces tending to separate them from the automobile member to which they are attached. Fig. 10 is a blown up view of plunger 14 and associated parts. The plunger comprising shaft 15 having shoulder 21, and head 16 is formed from one piece of metal, preferably steel. Compressible bushing 17 fits into recess 39 in head 16. Lock nut 19 is in two parts in order to permit removal of plunger 14 therefrom. The two parts of nut 19 are held together by a mating tongue and groove arrangement and snap ring 26 which fits into groove 40. Plunger 14 is fitted into the axial bore of roller gear 5 and is retained against longitudinal separating forces by shoulder 21 against lock nut 19. Roller gear 5 is held in place by means of shank 10 which protrudes through star gear 11 and is peaned over. Further anchorage is provided by screw 18 which is an oversize tapered screw which forces shank 10 open against star gear 11.

Bracket 20 is preferably made of steel and is associated with plunger 14, as illustrated in Figs. 3 and 7. The bracket is laterally arranged and positioned longitudinally behind restrained teeth 6 of striker member 3. Slot 41 in bracket 20 is adapted to mate with plunger shaft 15 and is therefore aligned therewith and has a receiving open end to permit entry of said shaft. The width of slot 41 is greater than that of shaft 15 but less than that of plunger head 16.

As illustrated in Fig. 8, which shows plunger 14 fitted within slot 41, the back surface of bracket 20 is positioned a distance (A) longitudinally behind the back surface of teeth 6 which must be greater than the distance (B) from the back surface of teeth 6 to the inner surface of plugner head 16 minus the distance (C) from the front surface of the teeth of roller gear 5 to the front surface of teeth 6, and less than the distance (B) from the back surface of teeth 6 to the inner surface of plunger head 16. Effectively the requirement is that the distance from teeth 6 to bracket 20 be slightly less than the distance from teeth 6 to plunger head 16 so that the plunger head passes behind the bracket during normal operating conditions and will contact the back surface of the bracket before there is longitudinal separation of the meshed gear teeth, thereby applying a counteracting force restraining such separation. Since plunger 14 extends directly from roller gear 5, the restraining force directly opposes the disengagement of the meshed teeth rather than affording the indirect opposition resulting from restraint at a point remote therefrom.

Bracket 20 is advantageously made a separate member and is positioned between automobile body 4 and striker plate 7. To permit entry of plunger head 16, a recess 22 is provided in the automobile body. With this arrangement the closing of the door would be prevented by plunger 14 in the event that plunger head 16 extended beyond the back wall 23 of the recess. Such interference is prevented by the hereinbefore described spring mounting of plunger 14 within roller gear 5, which permits longitudinal recession. Additionally the outer surface of plunger head 16 is tapered so that upon contact with the back wall of recess 22 a recessive force is applied to head 16, thereby adjusting the distance of plunger extension to the depth of recess 22. Hard rubber insert 24 within recess 22 facilitates the described self-adjustment by having a tapered receiving portion which cooperates with tapered head 16.

When the coacting members 1 and 3 are acted upon by separating longitudinal forces, the inner surface of plunger head 16 is pressed tightly against the back surface of bracket 20 thereby counteracting the separating forces.

It is advantageous under those circumstances to insure that plunger 14 remain within the bracket by restraining any tendency for the shaft 15 to slide laterally out of slot 21. Protuberances 25 are positioned one to either side of slot 21 and the vertical spacing between them is made less than the width of plunger head 16. Under usual operating conditions plunger head 16 will pass over the protuberances 25 as illustrated in Fig. 8, since their height is less than the clearance of the inner surface of head 16 over the back surface of bracket 20, but under stressed conditions when the inner surface of plunger head 16 is pressed against the back surface of bracket 20 protuberances 25 restrain any outward lateral motion.

To insure that plunger head 16 will pass over protuberances 25 under usual operating conditions, compressible bushing 17 is positioned within recess 39 in the inner surface of the plunger head, the width of said bushing being less than the vertical spacing between protuberances 25 so that the bushing may pass easily therebetween and the height of said bushing being sufficient in its uncompressed state to insure clearance of the inner surface of plunger head 16 over the protuberances. The receiving edges of bracket 20 about slot 21 are tapered to facilitate entry of bushing 17. The recess in the plunger head is made sufficiently larger than the bushing so that the bushing may be compressed therein under conditions of stress, thereby permitting the inner surface of plunger head 16 to contact the back surface of bracket 20.

The second feature incorporated in this invention is illustrated in Figs. 2 and 6. It comprises a washer 42 positioned longitudinally in front of roller gear 5 and axially coincident therewith. Washer 42 is maintained in position by means of locking nut 19 and housing 8. Washer 42 extends sufficiently beyond the dedendum circle of roller gear 5 to overlap restrained teeth 6 when the gears are in meshed relationship, as illustrated in Fig. 8, and is positioned sufficiently close to roller gear 5 to prevent longitudinal disengagement of the meshed teeth. As illustrated in Fig. 8, the receiving portion of teeth 6 is beveled to facilitate passage of washer 42.

The third feature of this invention is illustrated in Figs. 2, 3 and 7. Housing 8 of lock member 1 has an extension member 28 extending laterally in front of roller gear 5. Striker plate 7 has a recess 29 in the rear portion thereof positioned laterally behind stationary teeth 6. Recess 29 has a longitudinally outer wall 30. Compressible bumper 31 is fitted within recess 29 and is preferably made of hard rubber. The recess and bumper are in alignment with lateral extension 28 and positioned sufficiently laterally behind teeth 6 so that the extension member indents the bumper when lock member 1 and striker member 3 are in meshed relationship, as illustrated in Fig. 9. The recess prevents longitudinal and vertical displacement of lateral extension 28 and therefore separation of roller gear 5 and stationary teeth 6. This feature of the invention acts in a dual capacity, first as a longitudinal and vertical restraint and, secondly, as a bumper arrangement to prevent rattle and backlash.

The fourth feature of this invention, as illustrated in Figs. 2, 3 and 8, consists of two mating members 32 and 33, one associated with lock member 1 and the other with the striker member 3. Members 32 and 33 comprise essentially an interlocking arrangement, member 33 sliding within member 32 when the coacting members 1 and 3 are in meshed relationship. However, as illustrated in Fig. 8, members 32 and 33 do not physically contact one another and therefore do not interfere with the action of the roller gear and stationary teeth nor do they rattle or interfere with one another. However, under conditions of stress tending to displace the coacting members either vertically or longitudinally, members 32 and 33 contact one another, thereby counteracting such tendency.

The improvements comprising this invention prevent longitudinal and vertical separation of the coacting members comprising the conventional door lock mechanism without interfering with the conventionally operated lateral restraint. The described lock mechanism will withstand great longitudinal stress and will pull the coacting members out of the automobile members before allowing the door to fly open.

A preferred embodiment of the invention has been described. Various changes and modifications, however, may be made within the scope of the invention as set forth in the appended claims.

I claim:
1. In an automobile door lock mechanism comprising first and second coacting members one attached to the door and the other to the body of an automobile, said first member including a laterally arranged, rotatably mounted roller gear having external teeth thereon, and a locking mechanism to controllably prevent rotation of said roller gear, and said second member having laterally arranged restrained gear teeth adapted and positioned to mesh with said roller gear teeth, thereby exerting lateral restraint on said automobile door with respect to said automobile body, the improvement which comprises a plunger associated with said first member, said plunger comprising a shaft and overhanging head, said shaft being supported adjacent said roller gear and extending longitudinally therefrom plunger head first toward said second member, and a bracket associated with said second member, said bracket being laterally arranged, longitudinally behind the restrained teeth of said second member at a distance from said restrained teeth slightly less than the distance from said restrained teeth to the head of said plunger so that the head of said plunger passes behind said bracket and will contact said bracket before there is longitudinal disengagement of said meshed gear teeth, the bracket having a slot therein positioned in the path of the said plunger shaft and having a receiving open end to permit entry of said shaft, the width of said slot being larger than that of said plunger shaft but smaller than that of the said plunger head, said roller gear having a bore extending axially therethrough, said plunger shaft extending into said bore, including means for maintaining said shaft within said bore by limiting its movement in an outward direction, and spring means within said bore for resiliently limiting movement of said shaft in the opposite direction.

2. An automobile door lock mechanism according to claim 1 in which the outer end of said bore is threaded and in which the means for maintaining said shaft within the bore comprises a shoulder formed on the end of the plunger shaft opposite the plunger head and a lock nut surrounding said shaft and adapted to be threaded into the outer end of said bore.

3. An automobile door lock mechanism according to claim 2 in which the lock nut is a split nut formed in two parts and a snap ring is provided to hold said two parts together and said shaft until the lock nut is threaded into said bore.

4. In an automobile door lock mechanism comprising first and second coating members, each of said members being attached to a separate automobile member, one of said automobile members being a door and the other of said automobile members being the body associated with said door, said first member including a laterally arranged, rotatably mouned roller gear having external teeth thereon, and a locking mechanism to controllably prevent rotation of said roller gear, and said second member including a striker plate having laterally arranged restrained gear teeth thereon, said restrained gear teeth being adapted and positioned to mesh with said roller gear teeth thereby exerting lateral restraint on said automobile door with respect to said automobile body, the improvement which comprises a plunger associated with said first member, said plunger comprising a shaft and overhanging head, said shaft being supported adjacent said first member and extending longitudinally therefrom plunger head first otward said second member, a bracket associated with said second member, said bracket being laterally arranged, longitudinally behind said striker plate, at a distance from the said restrained teeth on said striker plate slightly less than the distance from said restrained teeth to the head of said plunger so that the head of said plunger passes behind said bracket and will contact said bracket before there is longitudinal disengagement of said meshed gear teeth, said bracket having a slot therein positioned in the path of said plunger head and having a receiving open end to permit entry of said shaft, the width of said slot being larger than that of said plunger shaft but smaller than that of said plunger head, and a recess within the automobile member to which the said second member is attached, positioned longitudinally behind the slot in said bracket for the accommodation of said plunger head.

5. In an automobile door lock mechanism comprising first and second coacting members, each of said members being attached to a separate automobile member, one of said automobile members being a door and the other of said automobile members being the body associated with said door, said first member including a laterally arranged, rotatably mounted roller gear having external teeth thereon and an axial bore therein, and a locking mechanism to controllably prevent rotation of said roller gear, and said second member including a striker plate having laterally arranged restrained gear teeth thereon, said restrained gear teeth being adapted and positioned to mesh with said roller gear teeth thereby exerting lateral restraint on said automobile door with respect to said automobile body, the improvement which comprises a plunger associated with said first member, said plunger comprising a shaft, and an overhanging head having a tapered outer surface, said shaft being supported within the axial bore of said roller gear so as to permit longitudinal recession of said shaft within said axial bore, said shaft extending longitudinally from said roller gear plunger head first toward said second member, a bracket associated with said second member, said bracket being laterally arranged, longitudinally behind said striker plate at a distance from the said restrained teeth associated with said striker plate slightly less than the distance from said restrained teeth to the head of said plunger so that the head of the said plunger passes behind said bracket and will contact said bracket before there is longitudinal disengagement of said meshed gear teeth, said bracket having a slot therein positioned in the path of said plunger head and having a receiving open end to permit entry of said shaft, the width of said slot being larger than that of said plunger shaft but smaller than that of said plunger head, and a recess within the automobile member to which the said second member is attached, positioned longitudinally behind the slot in said bracket for the accommodation of said plunger head.

6. In an automobile door lock mechanism comprising first and second coacting members, one attached to the door and the other to the body of an automobile, said coacting members being adapted to laterally restrain said door with respect to said body, the improvement which comprises a plunger associated with said first member, said plunger comprising a shaft and overhanging head, said shaft being supported adjacent said first member and extending longitudinally therefrom plunger head first toward the said second member, and a bracket associated with said second member, said bracket being laterally arranged, longitudinally behind said second member at a distance therefrom slightly less than the distance from said second member to the head of the said plunger so that the head of said plunger passes behind said bracket and will contact said bracket before there is longitudinal disengagement of said first and second members, said bracket having a slot therein positioned in the path of said plunger shaft and having a receiving open end to permit entry of said shaft, the width of said slot being larger than that of said plunger shaft but smaller than that of said plunger head, said bracket having two protuberances positioned on its back surface one to either side of the said slot, the vertical spacing between said protuberances being less than the width of said plunger head, and the height of said protuberances being less than the clearance of the inner surface of said plunger head over the back surface of said bracket.

7. In an automobile door lock mechanism comprising first and second coacting members, one attached to the door and the other to the body of an automobile, said members being adapted to laterally restrain said door with respect to said body, the improvement which comprises a plunger associated with said first member, said plunger comprising a shaft, an overhanging head having a recess in the inner surface thereof, and a compressible bushing fitted within said recess, said shaft being supported adjacent said first member and extending longitudinally therefrom plunger head first toward said second member, and a bracket associated with said second member, said bracket being laterally arranged, longitudinally behind said second member at a distance therefrom slightly less than the distance from said second member to the head of said plunger so that the head of said plunger passes behind said bracket and will contact said bracket before there is longitudinal disengagement of said first and second members, said bracket having a slot thereon positioned in the path of said plunger shaft and having a receiving open end to permit entry of said shaft, the width of said slot being larger than that of said plunger shaft but smaller than that of said plunger head, said bracket having two protuberances positioned on the back surface thereof one to either side of said slot, the vertical spacing between said protuberances being less than the width of said plunger head and greater than the width of said compressible bushing, and the height of said protuberances being less than the clearance of the inner surface of said plunger head over the back surface of said bracket, the height of said compressible bushing in uncompressed condition being sufficient to insure clearance of the inner surface of said plunger head over the said protuberances, said compressible bushing being sufficiently small in size with respect to the recess in said plunger head to fit within said recess when in compressed condition thereby permitting the inner surface of said plunger to contact the back surface of said bracket.

8. In an automobile door lock mechanism comprising first and second coacting members, each of said members being attached to an automobile member, one of said automobile members being a door and the other of said automobile members being the body associated with said door, said first member including a laterally arranged rotatably mounted roller gear having external teeth thereon, and a locking mechanism to controllably prevent rotation of said roller gear, and said second member including a striker plate having laterally arranged restrained gear teeth thereon, said gear teeth being adapted and positioned to mesh with said roller gear teeth thereby exerting lateral restraint on said automobile door with respect to said automobile body, the improvement which comprises a plunger associated with said first member, said plunger comprising a shaft and overhanging head, said shaft being supported adjacent said roller gear and extending longitudinally therefrom plunger head first toward the said second member, a bracket associated with said second member, said bracket being laterally arranged, longitudinally behind said striker plate at a distance from the restrained teeth associated with said striker plate slightly less than the distance from said restrained teeth to the head of said plunger so that the head of said plunger passes behind said bracket and will contact said bracket before there is longitudinal disengagement of the said meshed gear teeth, said bracket having a slot therein positioned in the path of said plunger shaft and having a receiving open end to permit entry of said shaft, the width of said slot being larger than that of said plunger shaft but smaller than that of said plunger head, said bracket having two protuberances positioned on the back surface thereof one to either side of said slot, the vertical spacing between said protuberances being less than the width of said plunger head, and the height of said protuberances being less than the clearance of the inner surface of said plunger head over the back surface of said bracket, and a recess within the automobile member to which the said second member is attached, said recess being positioned longitudinally behind the slot of the said bracket for the accommodation of said plunger head.

9. In an automobile door lock mechanism comprising first and second coacting members, each of said members being attached to a separate automobile member, one of said automobile members being a door and the other of said automobile members being a body associated with said door, said first member including a laterally arranged rotatively mounted roller gear having external teeth thereon and a coaxial bore therein, and a locking mechanism to controllably prevent rotation of said roller gear, and said second member including a striker plate having laterally arranged restrained gear teeth thereon, said gear teeth being adapted and positioned to mesh with said roller gear teeth thereby exerting lateral restraint on said automobile door with respect to said automobile body, the improvement which comprises a plunger associated with said first member, said plunger comprising a shaft, and an overhanging head having a tapered outer surface, said shaft being supported within the coaxial bore of said roller gear so as to permit longitudinal recession of said shaft within said coaxial bore, said shaft extending longitudinally from said roller gear plunger head first toward said second member, a bracket associated with said second member, said bracket being laterally arranged, longitudinally behind said striker plate at a distance from the said restrained teeth associated with said striker plate slightly less than the distance from said restrained teeth and the head of said plunger so that the head of the said plunger passes behind said bracket and will contact said bracket before there is longitudinal disengagement of said meshed gear teeth, said bracket having a slot therein positioned in the path of said plunger head and having a receiving open end to permit entry of said shaft, the width of said slot being larger than that of said plunger shaft but smaller than that of said plunger head, said bracket having two protuberances positioned on the back surface thereof one to either side of said slot, the vertical spacing between said protuberances being less than the width of said plunger head, and the height of said protuberances being less than the clearance of the inner surface of said plunger head from the back surface of said bracket, and a recess within the automobile member to which the said second member is attached, said recess being positioned longitudinally behind the slot of the said bracket for the accommodation of said plunger head.

10. In an automobile door lock mechanism comprising first and second coacting members one attached to the door and the other to the body of an automobile, said first member including a laterally arranged rotatably mounted roller gear having external teeth thereon, a locking mechanism to controllably prevent rotation of said roller gear, and a housing enclosing said roller gear, and said second member including a striker plate having laterally arranged restrained gear teeth thereon, said gear teeth being adapted and positioned to mesh with said roller gear teeth, thereby exerting lateral restraint on said automobile door with respect to said automobile body, the improvement which comprises a lateral extension forming part of said housing and extending laterally in front of said roller gear, said striker plate having a recess therein and a compressible bumper within said recess, said recess and bumper being positioned in alignment with said extension member and sufficiently laterally behind the restrained gear teeth of said striker plate so that said extension member indents said bumper when the said gear teeth are in meshed relationship to prevent accidental separation of said restrained gear teeth and the external teeth on said roller gear.

11. In an automobile door lock mechanism comprising first and second coacting members, one attached to the door and the other to the body of an automobile, said coacting members being adapted to laterally restrain said door with respect to said automobile body, the improvement which comprises a plunger and bracket combination, said plunger being associated with said first member and comprising a shaft and an overhanging head, said shaft being supported adjacent said first member and extending longitudinally therefrom plunger head first toward the said second member, and said bracket being associated with said second member, said bracket being laterally arranged, longitudinally behind the second member at a distance therefrom slightly less than the distance from said second member to the head of said plunger so that the head of said plunger passes behind said bracket and will contact said bracket before there is longitudinal disengagement of said first and second members, said bracket having a slot therein positioned in the path of said plunger shaft and having a receiving open end to permit entry of said shaft, the width of said slot being larger than that of said plunger shaft but smaller than that of said plunger head, and a lateral extension member and recess combination, said lateral extension being associated with said first member and extending laterally in front of said first member, and said recess being associated with said second member and having a compressible bumper therein, said recess and bumper being positioned in alignment with said lateral extension member and sufficiently laterally removed from said first coacting member so that said extension member indents said compressible bumper when the coacting members are in locked relationship, said shaft being positioned in said slot so as not to engage the end of said slot when the coacting members are in locked position.

12. In an automobile door lock mechanism comprising first and second coacting members, one attached to the door and the other to the body of an automobile, said first member including a laterally arranged rotatably mounted roller gear having external teeth thereon, a locking mechanism to controllably prevent rotation of said roller gear, and a housing enclosing said roller gear, and said second member including a striker plate having laterally arranged restrained gear teeth thereon, said gear teeth being adapted and positioned to mesh with said roller gear teeth thereby exerting lateral restraint on said automobile door with respect to said automobile body, the improvement which comprises a plunger associated with said first member, said plunger comprising a shaft and overhanging head, said shaft being supported adjacent said roller gear and extending longitudinally therefrom plunger head first towards said second member, a bracket associated with said second member, said bracket being laterally arranged, longitudinally behind the restrained teeth on said second member at a distance from said restrained teeth slightly less than the distance from said restrained teeth to the head of said plunger so that the head of said plunger passes behind said bracket and will contact said bracket before there is longitudinal disengagement of said meshed gear teeth, the bracket having a slot therein positioned in the path of the said plunger shaft and having a receiving open end to permit entry of said shaft, the width of said slot being larger than that of said plunger shaft but smaller than that of the said plunger head, and a lateral extension forming part of said housing and extending laterally in front of said roller gear, said striker plate having a recess therein and a compressible bumper within said recess, said recess and bumper being positioned in alignment with said extension member and sufficiently laterally behind the restrained gear teeth of said striker plate so that said extension member indents said bumper when the said gear teeth are in meshed relationship and prevents said shaft from engaging the end of said slot.

References Cited in the file of this patent

UNITED STATES PATENTS

| | | |
|---|---|---|
| 419,891 | Schade et al. | Jan. 21, 1890 |
| 1,192,733 | Bennett | July 25, 1916 |
| 1,352,010 | Lurie | Sept. 7, 1920 |
| 2,100,591 | Haberstump | Nov. 30, 1937 |
| 2,314,613 | Endter | Mar. 23, 1943 |
| 2,458,751 | Voight | Jan. 11, 1949 |
| 2,629,620 | Roethel | Feb. 24, 1953 |
| 2,679,420 | Crockett | May 25, 1954 |
| 2,680,037 | Marple | June 1, 1954 |
| 2,689,758 | Orr | Sept. 21, 1954 |

FOREIGN PATENTS

| | | |
|---|---|---|
| 267,400 | Great Britain | Mar. 17, 1927 |
| 706,710 | France | Mar. 31, 1931 |

UNITED STATES PATENT OFFICE
CERTIFICATE OF CORRECTION

Patent No. 2,893,774                                                        July 7, 1959

Tracy L. Carpenter

It is hereby certified that error appears in the printed specification of the above numbered patent requiring correction and that the said Letters Patent should read as corrected below.

Column 2, line 58, for "coating" read -- coacting --; column 4, line 37, for "strike" read -- striker --; column 5, line 39, for "plugner" read -- plunger --; column 7, line 58, for "coating" read -- coacting --; line 63, for "mouned" read -- mounted --; line 75, for "otward" read -- toward --.

Signed and sealed this 10th day of November 1959.

(SEAL)
Attest:

KARL H. AXLINE
Attesting Officer

ROBERT C. WATSON
Commissioner of Patents